United States Patent
Hong (10) Patent No.: US 9,744,681 B2
(45) Date of Patent: Aug. 29, 2017

(54) KNIFE AND SCISSORS PROVIDED WITH PROTECTION MEANS

(71) Applicant: Ki Young Hong, Seoul (KR)

(72) Inventor: Ki Young Hong, Seoul (KR)

( * ) Notice: Subject to any disclaimer, the term of this patent is extended or adjusted under 35 U.S.C. 154(b) by 0 days.

(21) Appl. No.: 14/438,789

(22) PCT Filed: Oct. 25, 2013

(86) PCT No.: PCT/KR2013/009572
§ 371 (c)(1),
(2) Date: Apr. 27, 2015

(87) PCT Pub. No.: WO2014/065629
PCT Pub. Date: May 1, 2014

(65) Prior Publication Data
US 2015/0283717 A1    Oct. 8, 2015

(30) Foreign Application Priority Data

Oct. 26, 2012    (KR) .................. 10-2012-0120026

(51) Int. Cl.
*B26B 3/00*    (2006.01)
*B26B 11/00*    (2006.01)
(Continued)

(52) U.S. Cl.
CPC ............ *B26B 29/02* (2013.01); *A22C 25/006* (2013.01); *B26B 9/00* (2013.01); *B26B 11/006* (2013.01); *B26B 29/04* (2013.01)

(58) Field of Classification Search
CPC   B26B 29/02; B26B 29/04; B26B 9/00; B26B 9/02; B26B 3/00; B26B 11/006; A22C 25/006
(Continued)

(56) References Cited

U.S. PATENT DOCUMENTS 1,988,386 A * 1/1935 Komperud ........... A22C 25/006
30/314
2,126,080 A * 8/1938 Backer .................... A47J 17/02
30/353

(Continued)

FOREIGN PATENT DOCUMENTS

GB           2473242 A  *  3/2011
KR      20-0384835 Y1     5/2005
KR   20-2011-0004046 U    4/2011

OTHER PUBLICATIONS

International Search Report for PCT/KR2013/009572 mailed Jan. 29, 2014.
Written Opinion for PCT/KR2013/009572 mailed Jan. 29, 2014.

*Primary Examiner* — Hwei C Payer
(74) *Attorney, Agent, or Firm* — Hauptman Ham, LLP (57) ABSTRACT

A knife and scissors having a protection means are disclosed. The knife, which has a handle, a body extended in one direction in engagement with the handle, and a body blade formed at the bottom of the body, for performing a cutting action, includes a protrusion spaced upward from a distal end of the body, an insertion portion formed in a space between the body and the protrusion, and an upper blade formed at the bottom of the insertion portion. The upper blade cuts an object inserted in the insertion portion and the protrusion protects a human body or the object by contacting the body or the object earlier than the distal end of the body, when the body slips off the object.

5 Claims, 6 Drawing Sheets

(51) Int. Cl.
*B26B 29/02* (2006.01)
*B26B 29/04* (2006.01)
*A22C 25/00* (2006.01)
*B26B 9/00* (2006.01)

(58) Field of Classification Search
USPC .......................................................... 30/353
See application file for complete search history.

(56) References Cited

U.S. PATENT DOCUMENTS

| | | | | |
|---|---|---|---|---|
| 3,839,788 A * | 10/1974 | Addis | ................... | A01M 31/00 |
| | | | | 30/155 |
| 4,198,751 A * | 4/1980 | Egbert | ................. | A22C 25/006 |
| | | | | 30/286 |
| 4,569,103 A * | 2/1986 | Taurinskas | ........... | A22C 29/024 |
| | | | | 452/6 |
| 4,753,009 A | 6/1988 | Haga | | |
| 5,613,904 A * | 3/1997 | LaSalle | ................. | A22C 29/024 |
| | | | | 30/120.1 |
| 5,784,787 A * | 7/1998 | Jensen | ....................... | B26B 3/00 |
| | | | | 30/168 |
| 7,121,939 B1 * | 10/2006 | Quaglino | ............. | A22C 29/024 |
| | | | | 452/6 |
| 9,119,644 B2 * | 9/2015 | Boettner | ............. | A61B 17/025 |
| 2008/0178474 A1 | 7/2008 | Spencer et al. | | |
| 2015/0283717 A1 * | 10/2015 | Hong | ..................... | B26B 29/04 |
| | | | | 30/146 |

* cited by examiner

KNIFE AND SCISSORS PROVIDED WITH PROTECTION MEANS

CROSS REFERENCE TO RELATED APPLICATION

This application claims the benefit of Korean Patent Application No. P2012-0120026, filed on Oct. 26, 2012, which is hereby incorporated by reference as if fully set forth herein.

BACKGROUND OF THE INVENTION

Field of the Invention

The present invention relates to a knife and scissors, and more particularly, to a knife and scissors having a protection means that can prevent an unpredicted accident to a user and provide a sense of safety in terms of appearances.

Discussion of the Related Art

In general, knives and scissors are widely used as portable consumer cutting devices.

Various types of knives are available, such as a doubled-edged knife with top and bottom blades and a single-edged knife with a bottom blade. A typical kitchen knife has only a bottom blade (i.e., single-edged). The kitchen knife is used as a tool with which food materials are processed for cooking in a kitchen, for example, vegetables, meat, and fish are cut or various condiments including peppers, garlic, etc. are chopped.

Specifically, the blade formed at the bottom of the body of the knife is formed into various shapes such as a straight line or arc, with a wedge-shaped cross section. When a user applies a certain amount of pressure downward on an object, holding the handle of the knife, the object is cut in proportion to the force applied to it.

Scissors are a cutting device with two bodies connected by a hinge. As a user moves two handles of the scissors with facing blades upon a hinge so that the handles may approach or move away from each other, the pair of blades are brought into close contact and thus cut an object between them. One body of the scissors is formed roughly into a similar shape to a knife blade.

Specifically, the body of the knife or the bodies of the scissors are tapered toward its end or their ends along a length direction so that its cross section or their cross sections may decrease toward the end(s). Thus, the distal end(s) of the body (bodies) are pointed.

Knives or scissors are often used in a place such as a kitchen and an office in a daily living. Their sharp ends often bring about safety incidents. Moreover, users feel unsafe due to their concerns about safety risks involved in knives or scissors.

Sometimes, a kitchen knife needs to be used in a reverse direction. For example, when a user processes a food material having an outer skin to be peeled off, such as seafood or fruit, the user reverses the knife to point the blade upward and removes the outer skin with the sharp tip of the end of the knife inserted into a specific part of the food material. In this state, the user generally applies force forward and upward.

Different parts of an object to be processed or cut require different amounts of pressure. Therefore, the blade often slips off the object, causing an unpredicted safety incident. This incident occurs because it is difficult to apply a force uniformly due to the reverse use of the blade in an upward-pointing state and the blade is likely to point toward the user.

Although a portable consumer cutting device such as a conventional knife or scissors has a simple structure and thus is readily manufactured and carried, it has a high risk of safety incidents according to its use state. If a safety device is added to the portable consumer cutting device, the portable consumer cutting device is excessively complex in structure and causes higher manufacture cost, which makes it unpractical to add the safety device.

SUMMARY OF THE INVENTION

Accordingly, the present invention is directed to a knife and scissors having a protection means that substantially obviate one or more problems due to limitations and disadvantages of the related art.

An object of the present invention is to provide a knife and scissors having a protection means which has a simplified structure and minimizes the risk of safety incidents and a sense of unsafety that the looks of the knife and scissors may give.

Another object of the present invention is to provide a knife and scissors having a protection means which can perform a protection function and a function of guiding to an accurate position at the same time, when the knife and scissors are used.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a knife with a protection means, which has a handle, a body extended in one direction in engagement with the handle, and a body blade formed at the bottom of the body, for performing a cutting action, includes a protrusion spaced upward from a distal end of the body, an insertion portion formed in a space between the body and the protrusion, and an upper blade formed at the bottom of the insertion portion. The upper blade cuts an object inserted in the insertion portion and the protrusion protects a human body or the object by contacting the body or the object earlier than the distal end of the body, when the body slips off the object.

The insertion portion may be shaped into a wedge having a longitudinal width decreased toward the other end of the insertion portion. Accordingly, a thin film or skin of an object can be peeled off efficiently.

The insertion portion may include an inner blade at its other end. Thus, a cutting action may be performed reliably.

The insertion portion may further include a lower blade formed at the bottom of the protrusion. Thus, a downward cutting action and an upward cutting action can be performed effectively, with an object inserted in the insertion portion.

The protrusion may be wider in forward and backward directions than the body and guide a forward proceeding of the upper blade, in close contact with a surface of the object to be cut, when a cutting action is performed by the upper blade. Therefore, an action accuracy is increased and the risk of safety incidents is minimized.

The knife may further include a step for protruding the distal end of the body having the upper blade formed therein further than the protrusion in a forward or backward direction. Therefore, even when the knife is used tilted on the object, cutting efficient is increased.

A side section of the protrusion may be convex downward and when the body is tilted with respect to the object, the protrusion may guide a cutting action of the upper blade by changing the position of a part of the bottom of the protrusion contacting a surface of the object. Therefore, since the way a user grabs the knife can be dealt with, the object can be accurately cut.

In another aspect of the present invention, scissors with a protection means, which have a first body, a second body, and a hinge connecting the first body to the second body, for cutting an object by rotating the first and second bodies upon the hinge and advancing the first and second bodies toward each other, include a protrusion protruding in one direction, spaced upward from a distal end of the first body, an insertion portion formed between the distal end of the body and the protrusion, and an upper blade formed at the bottom of the insertion portion, for cutting an object. The upper blade cuts an object inserted in the insertion portion and the protrusion protects a human body or the object by contacting the body or the object earlier than the distal end of the first or second body, when the first body slips off the object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

With reference to the attached drawings, a knife and scissors having a protection means according to the present invention will be described in great detail.

Figure 1:
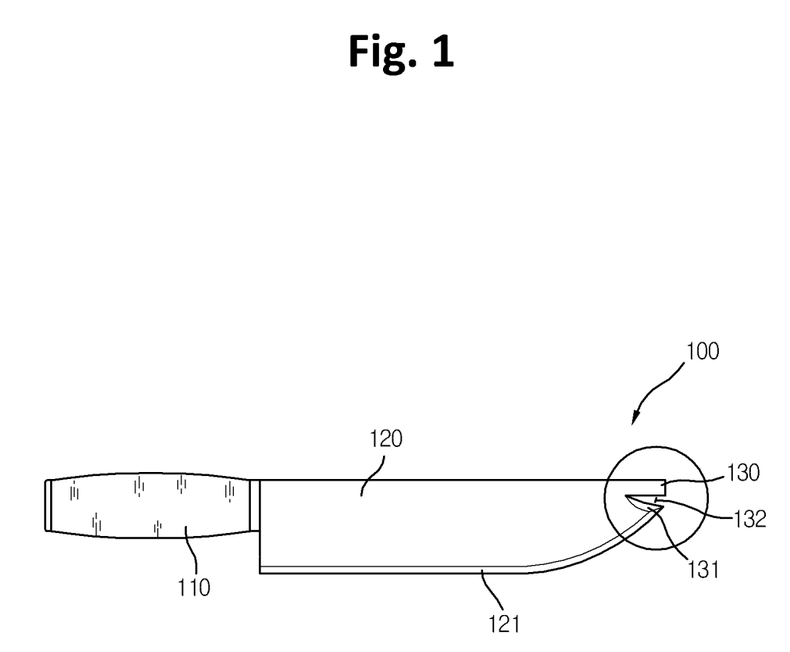
FIG. 1 illustrates a knife having a protection means according to an embodiment of the present invention.

FIG. 1 illustrates a knife having a protection means according to an embodiment of the present invention.

Referring to FIG. 1, a knife 100 basically includes a handle 110 having a predetermined diameter, to be grabbed by a user, and a body 120 having a body blade 121 at its bottom, engaged with an end portion of the handle 110.

While the present invention is described in the context of a knife having only a bottom blade (i.e., a single-edged knife), this is purely exemplary. Thus, it is to be clearly understood that the present invention is also applicable to a knife having both a top blade and a bottom blade (i.e. a double-edged knife). Herein, the term "one end (portion, side, or direction)" is defined as a distal end of the body 120 and the term "the other end (portion, side, or direction)" is defined as a part of the body 120 engaged with the handle 110 based on the state of the knife 100 illustrated in FIG. 1.

In general, to allow a user to stab with the distal end of the knife 100, the knife 100 is tapered toward one end of the body 120 in such a manner that the cross section of the body 120 may be decreased toward the one end of the body 120. Accordingly, there is a risk of safety incidents for the knife user, as described before. Especially, because the distal end of the knife 100 is pointed, the use of the body blade 121 in an upward reverse state further increases the risk of safety incidents. In this context, the present invention provides a knife having a protection means to overcome this problem.

The knife 100 according to the present invention basically includes a protrusion 130 protruding in one direction from an upper portion of the body blade 121, an insertion portion 132 formed between the protrusion 130 and one end of the body blade 121, for allowing insertion of an object, and an upper blade 131 formed on the body blade 121 that defines the insertion portion 132.

The body 120 may be generally formed of an anti-corrosive metal such as stainless steel, or a synthetic resin, which should not be construed as limiting the present invention.

The handle 110 has a thickness large enough to allow the user to grab the handle 110. While the handle 110 is shown in FIG. 1 as shaped into a cylinder roughly convex at its center, various shapes and materials are available for formation of the handle 110.

Although the protrusion 130 and the body 120 may be configured as separate members and then combined, it is preferred to integrate the protrusion 130 with the body 120 in consideration of productivity. More preferably, the protrusion 130 and the body 120 may be cast or injection-molded.

As described before, the body blade 121 is formed at the bottom of the body 120. When seen from the side, the body blade 121 is shaped into a wedge tapered downward with a decreased cross section and functions to cut or chop an object by transferring a pressing force applied by the user to the object over a narrow area.

The body blade 121 may be extended to the distal end of the body 120. As described before, the distal end of the body 120 may be pointed to allow a stabbing motion.

The protrusion 130 is apart upward from the upper blade 131 with a predetermined spacing in between, protruding in a forward direction from the body 120. The protrusion 130 is roughly rectangular, by way of example, when seen from the front. The protrusion 130 may be formed selectively into many other shapes. Specific embodiments of the protrusion 130 will be described later with reference to FIGS. 2 and 3.

The protrusion 130 preferably protrudes in the one direction further than the distal end of the body 120 having the body blade 121 formed therein. As described before, since the distal end of the body blade 121 is conventionally pointed, there is a risk of safety incidents. Accordingly, if the protrusion 130 protrudes forward, spaced upward from the distal end of the body 120 having the body blade 121, the protrusion 130 first contacts an object or a human body. As a consequence, the risk of safety incidents can be reduced remarkably.

Although the protrusion 130 and the distal end of the body 120 may be integrally formed, the insertion portion 132 may be formed as a spacing between the protrusion 130 and the distal end of the body 120. The insertion portion 132 forms a space in which a predetermined part of an object may be inserted. As described later, if the knife 100 is to be used reversely, the protrusion 130 may function as a guide.

The upper blade 131 may further be formed on the distal end of the body 120 in which the insertion portion 132 is formed. The upper blade 131 may be shaped into a wedge, facing the body blade 121 and may perform a cutting function independently.

In some cases, a kitchen knife or stationery knife having only a bottom blade (i.e., a single-edge knife) needs to be used reversely with the blade directed upward. In this case, there is a risk of safety incidents, as described before. In contrast, the upper blade 131 formed on the bottom of the insertion portion 132, that is, on the distal end of the body 120 significantly increases the convenience of the reverse use of the knife 100 in the present invention.

Therefore, when the skin of an object is peeled off or removed, the user may stab a specific part of the object with the distal end of the body 120 and then press the distal end of the body 120 upward and forward, thereby cutting the object with the upper blade 131.

Therefore, since the user does not need to direct the body blade 121 upward, even though the user inadvertently slips the knife 100 off the object, the upper portion of the body 120 or the protrusion 130 first contacts the user, thereby decreasing the risk of safety incidents.

Figure 2:
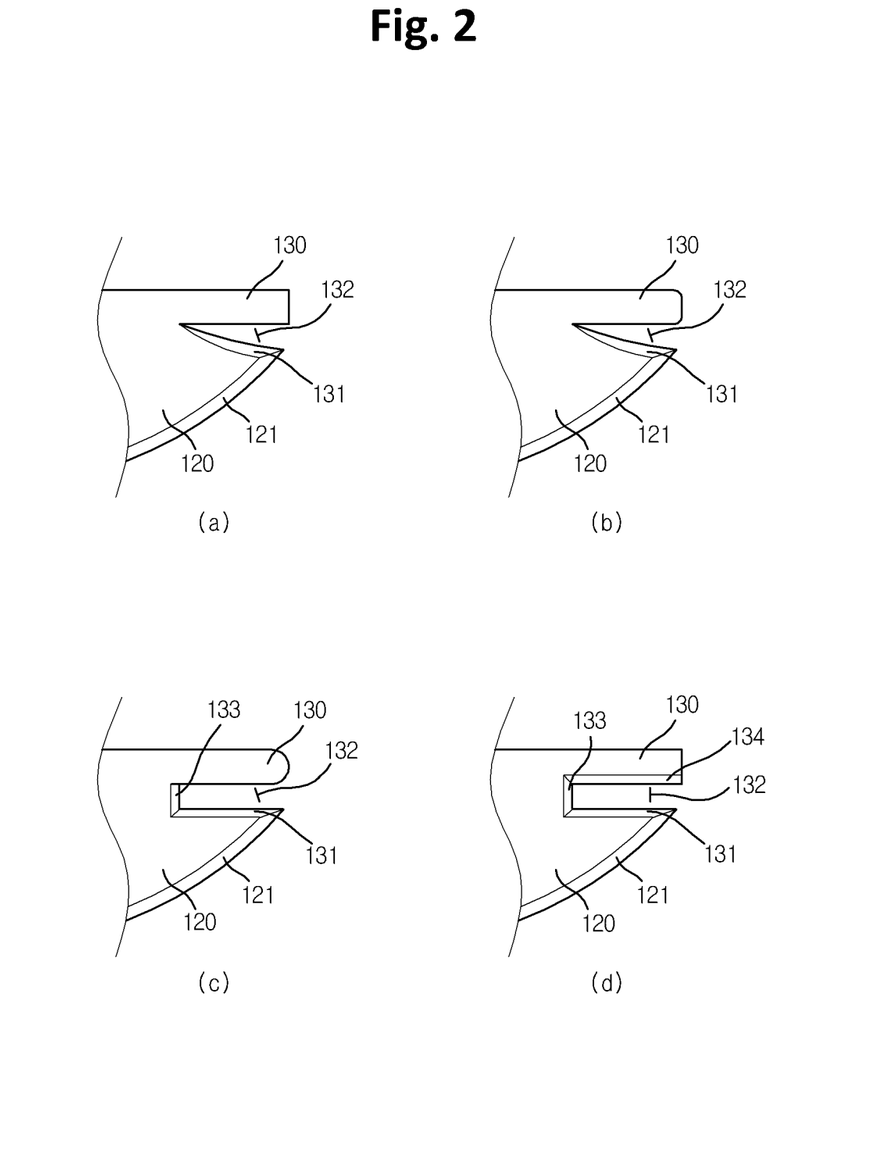
FIG. 2 are side views of the distal tips of knives each having a protection means according to various embodiments of the present invention.

FIG. 2 illustrates various embodiments of the distal end of the knife.

FIG. 2(a) is an enlarged view of the distal end of the knife illustrated in FIG. 1. Referring to FIG. 2(a), the protrusion 130 is roughly rectangular. The end portion of the protrusion 130 is at least level with or protrudes further than the distal end of the body 120 in which the body blade 121 is formed.

Preferably, the insertion portion 132 gets narrowed in the other direction so that its cross section may be decreased in the other direction. Thus, the efficiency of a cutting motion with the upper blade 131 can be further increased. For example, if the scales of a fish are to be peeled off, the user may easily peel off the scales from the fish with this inner blade by stabbing the knife 100 into a specific part of the fish, inserting a part of the skin of the fish into the insertion portion 132, and then proceeding the insertion to the other end of the insertion portion 132, because a part at which the upper blade 131 and the body blade 121 meet is pointed.

FIG. 2(b) illustrates a modification example of the protrusion 130. Referring to FIG. 2(b), the corners of the end of the protrusion are rounded. If the corners of the protrusion 130 are pointed as illustrated in FIG. 2(a), there is a risk of safety incidents. On the contrary, if the protrusion 130 has rounded corners, the risk of safety incidents is advantageously decreased.

Further, a part in which the upper blade 131 is formed may be curved downward with a curvature. In this case, if the opening of the insertion portion 132 is wider, a cutting effect can be increased.

FIG. 2(c) illustrates another embodiment of the protrusion 130 and the insertion portion 132. In FIG. 2(c), the end of the protrusion 130 is rounded. As in FIG. 2(b), if the protrusion 130 is roughly arc-shaped, use safety is increased and the looks of the protrusion 130 are better.

While the insertion portion 132 is shaped into a wedge so that the insertion portion 132 may have a cross section decreased in an inward direction in the foregoing embodiments, the insertion portion 132 may be shaped roughly into a rectangular recess and an inner blade 133 may be additionally formed at the other end of the insertion portion 132 in FIG. 2(c).

When the knife 100 needs to be reversely used as described before, the user may remove, for example, the skin of an object easily with the inner blade 133 and the upper blade 131 in a right-direction use state. However, if the upper blade 131 is curved as illustrated in FIG. 2(b), the upper blade 131 is extended to the other end of the insertion portion 132. In this case, the upper blade 131 and the inner blade 133 may be extended to each other.

Compared to the foregoing embodiments, the upper blade 131 may also be extended from the distal end of the body 120 only along a part of the insertion portion 132, rather than to the other end of the insertion portion 132.

FIG. 2(d) illustrates an example in which a lower blade 134 is additionally formed at the bottom of the protrusion 130.

It may occur that the knife 100 needs to be used in a right direct and a reverse direction. In this case, if the distal end of the body 120 is shaped as illustrated in the example of FIG. 1, the body blade 121 and the upper blade 131 should be used alternately in a specific part of an object. However, if the user cuts an object by pressing upward the upper blade 131 and cuts the object by pressing downward the lower blade 134, the user may make two or more motions at the same time through the insertion portion 132.

The lower blade 134 is applicable to other embodiments as well as the embodiment illustrated in FIG. 2(d) and it is to be clearly understood that the concept of the present invention is not limited to the above-described embodiments of the protrusion 130, the insertion portion 132, and the body 120.

Figure 3:
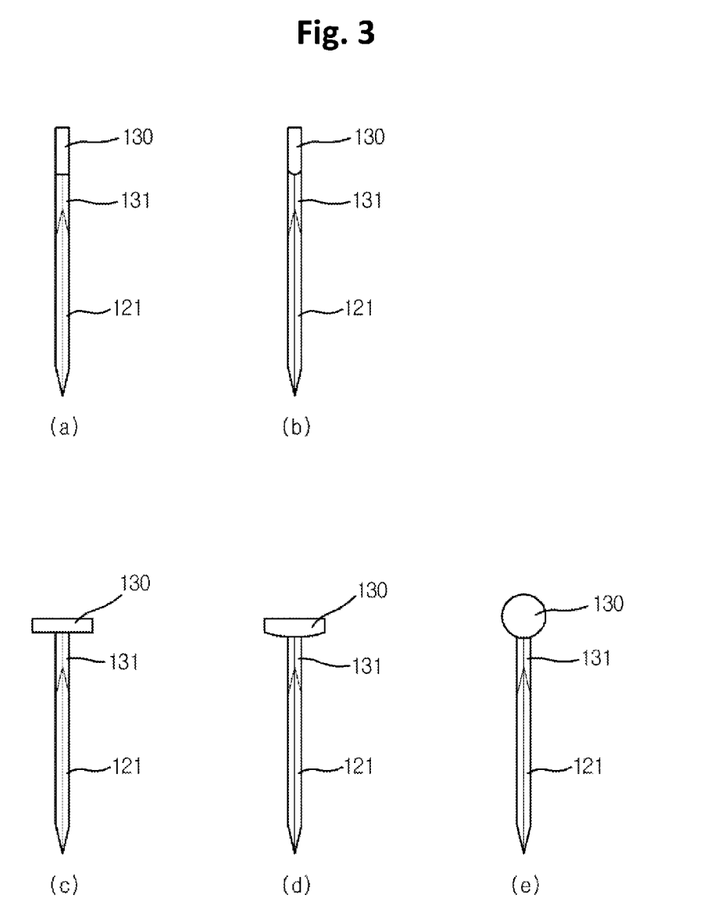
FIG. 3 are front views of the distal tips of knives each having a protection means according to various embodiments of the present invention.

FIG. 3 illustrate the end tips of knives each having a protection means according to various embodiments of the present invention, when viewed from the side of the end tips of the knives.

FIG. 3(a) illustrates an example applicable to the embodiment of FIG. 2(a). Referring to FIG. 3(a), the side section of the protrusion is roughly rectangular and one end of the protrusion 130 is apart from the distal end of the body 120 by a predetermined gap in the opening of the insertion portion 132.

Although the upper blade 131 may ascend inward, extended to a position at which the body 120 and the protrusion 130 meet, the inner blade 133 may further be formed as illustrated in FIG. 2(a). The lower blade 134 is applicable to all of various embodiments of the present invention which will be described below.

FIG. 3(b) illustrates an example in which the bottom of the protrusion 130 is curved, when viewed from the side. Referring to FIG. 3(b), the upper blade 131 may be useful in peeling off a specific thin skin of an object as described before. Herein, the bottom of the protrusion 130 may function as a guide on the skin of the object.

That is, the skin of the object may be sequentially cut and separated to the left and right by inserting a specific part of the object into the insertion portion 132 and pressing the object forward and/or upward. Herein a part or the whole of the bottom of the protrusion 130 may guide the proceeding of the upper blade 131 by closely contacting the surface of the object.

As described before, when a knife having only a bottom blade (i.e. a single-edged knife) is reversely used by pointing the bottom blade upward, it is difficult to form a support part, thereby increasing the risk of safety incidents. In contrast, since the protrusion 130 supports a specific part of the object, functioning as a guide, a cutting motion is possible by leverage and thus an accurate, safe function can be executed.

Embodiments of the present invention as described below are about modification examples that reinforce the guiding function.

FIG. 3(c) illustrates an example in which the protrusion 130 protrudes further forward and backward than the body 120. The definitions of forward and backward are based on the layout of FIG. 1. The side section of the protrusion 130 may be roughly rectangular, particularly elongated in a width direction.

The bottom of the protrusion 130 is wider than the body 120 and may be more effectively brought into close contact with the surface of an object.

FIG. 3(d) illustrates an example in which the protrusion 130 is wider forward and backward, with its bottom rounded downward. Since the bottom of the protrusion 130 is gradually curved, an object can be cut with minimal damage to the surface of the object.

While the bottom of the protrusion 130 is described as convex downward, it may be convex. It is apparent that the bottom of the protrusion 130 may be concave or convex downward along both sides.

FIG. 3(e) illustrates an example in which the protrusion 130 has a circular or oval side section. In this case, the knife 100 may be used in various ways depending on tilted uses of the knife 100 and that with minimal damage to an object and enhanced looks.

Figure 4:
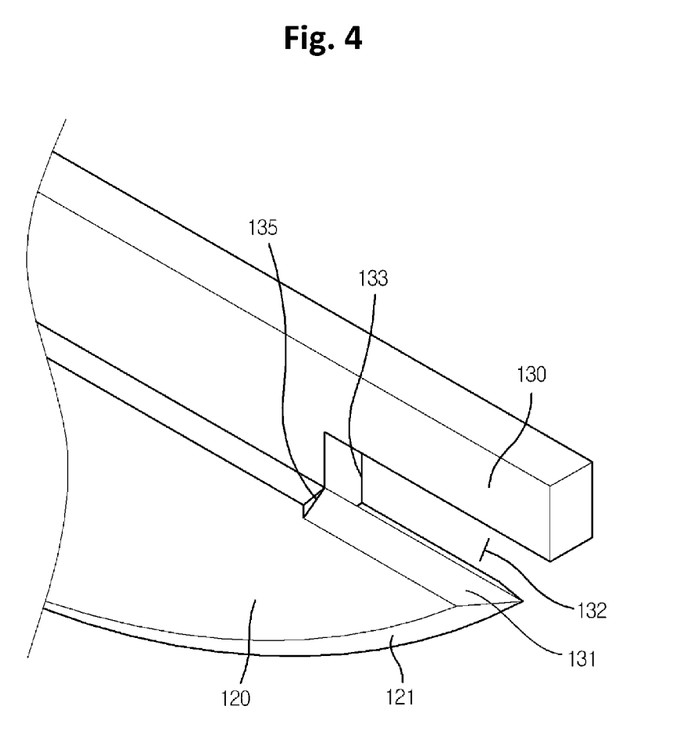
FIG. 4 illustrates a knife having a protection means according to another embodiment of the present invention.

FIG. 4 is a perspective view of a knife according to another embodiment of the present invention.

Referring to FIG. 4, the protrusion 130 is formed above the distal end of the body 120, with the insertion portion 132 formed in between. A motion such as peel-off of the skin of an object may be made with the knife. In general, the knife is used with the body 120 tilted forward and backward more often than with the body 120 upright over the ground or an object in a kitchen or an office. In this case, the object may not be cut accurately and particularly, the skin of the object may be peeled off less efficiently due to the thickness of the body 120. Moreover, since the protrusion 130 is likely to impair reverse use of the knife, the distal end of the body 120 and the protrusion 130 may be mutually stepped forward or backward in order to overcome this problem.

Specifically, a step 135 may be formed to protrude forward at a position at which a part of the body 120 having the upper blade 131 is connected to the protrusion 130

Although the height of the step 135 may vary, the upper end of the upper blade 131 roughly corresponds to a forward corner of the protrusion 130 in the example of FIG. 4.

While it has been described in the example of the present invention that the insertion portion 132 is roughly square, the inner blade 133 is formed at the other end of the insertion portion 132, and thus the step 135 is formed at a lower end portion of the inner blade 133, the step 135 may be formed right under the protrusion 130. Therefore, the present invention is not limited to the specific embodiment and thus it is to be understood that the various embodiments of FIG. 2 are applicable to shapes apparent from the present invention. Thus, the user may use the knife easily when tilting the knife forward on an object.

Figure 5:
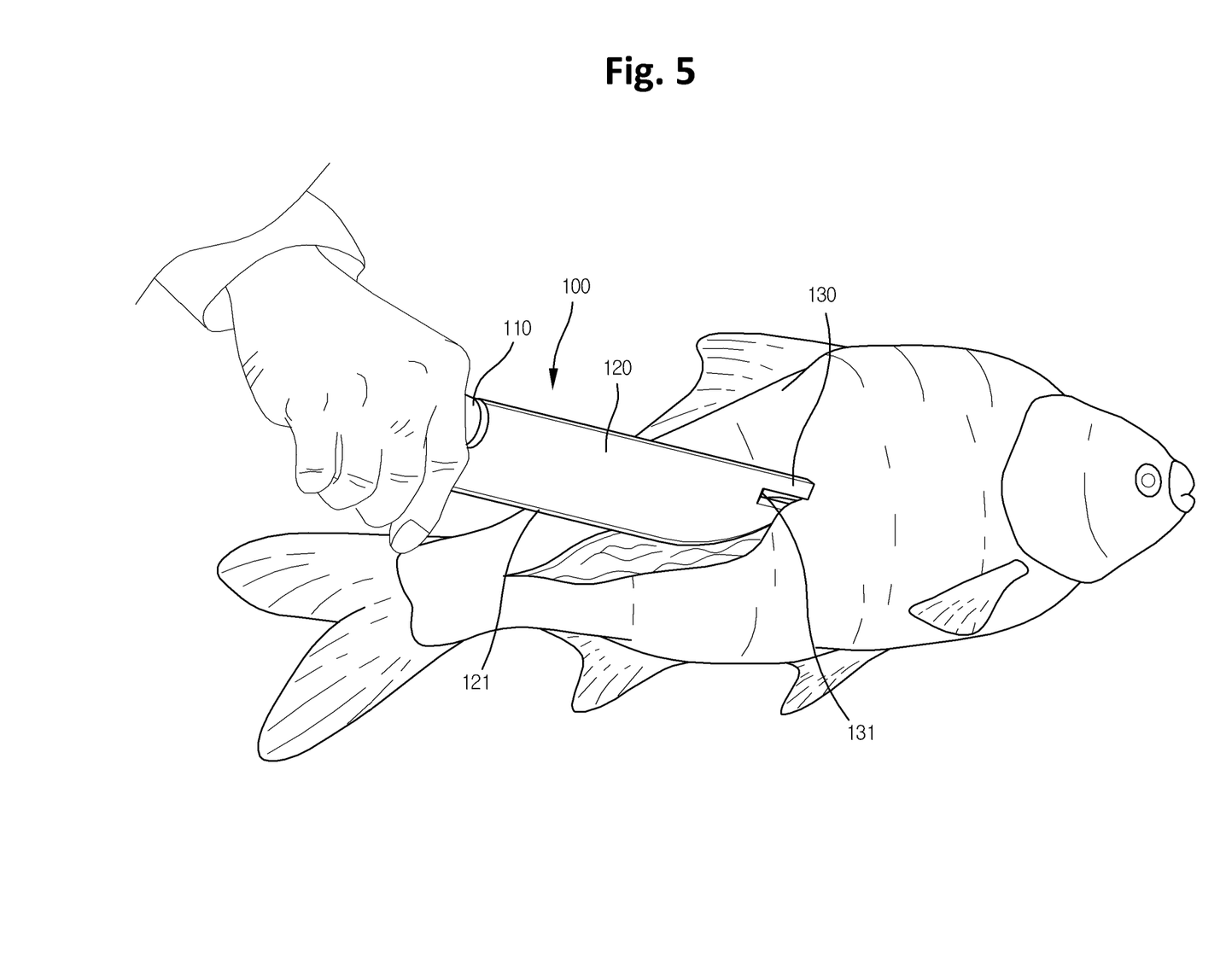
FIG. 5 illustrates a use state of a knife having a protection means according to the present invention.

FIG. 5 is a view illustrating a use state of a knife having a protection means according to the present invention.

In operation, when the knife needs to be reversely used, the user may use the upper blade 131. Specifically, if the user needs to continuously cut a thin skin of an object such as a fish, the user may stab the distal end of the body 120 into a specific part of the object and cut the skin, while inserting the skin into the insertion portion 132.

During the action, the user presses the knife forward on the object, holding the handle 110 and cuts the object with the upper blade 131, while a specific part of the protrusion 130 supports the object.

In this manner, the skin of the object can be peeled off efficiently without interruptions in the middle of a cutting motion by means of the protrusion 130, the insertion portion 132, and the upper blade 131. Consequently, the risk of safety incidents is remarkably reduced.

The operation mechanism of the protrusion 130, the insertion 132, and the upper blade 131 according to the present invention is applicable to various (single-edged) cutting devices having only a bottom blade as well as the knife.

Figure 6:
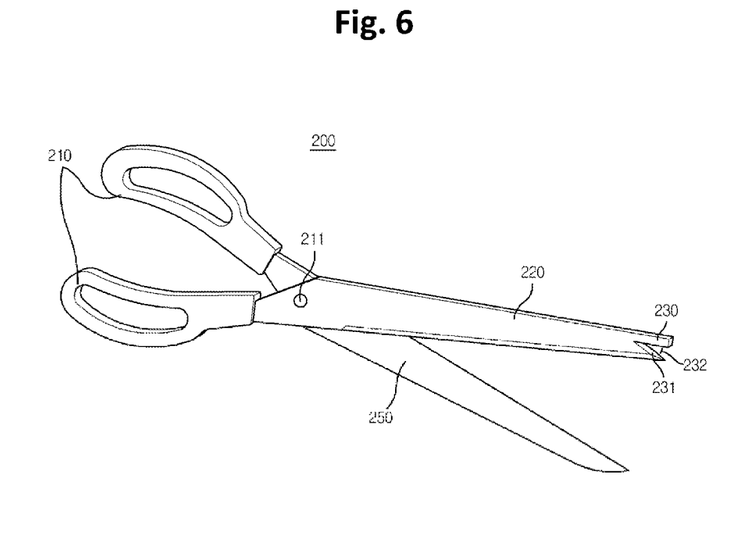
FIG. 6 is a perspective view illustrating a pair of scissors having a protection means according to the present invention.

FIG. 6 is a perspective view illustrating a pair of scissors having a protection means according to the present invention.

Referring to FIG. 6, a pair of scissors 200 cut an object placed between two members, that is, a first body 220 and a second body 250 through leverage movement between the first and second bodies 220 and 250.

Each of the first and second bodies 220 and 250 is grabbed by means of a handle 210. As the handles 210 approach or move away from each other, edges of the first and second bodies 220 and 250 cut an object by contacting or departing from each other upon a hinge 211.

A facing edge of the first or second body 220 or 250 does not need to be shaped into a blade. Rather, it is sufficient to form a sharp edge only in a part in which a lower edge of the first body 220 and an upper edge of the second body 250 meet. However, it is preferred that an edge of at least one body has a wedge-shaped side section like a knife blade in order to ensure the efficiency of a cutting motion.

Like the afore-described knife, the scissors 200 need to be used, inserted in a specific part and the first body 220 and/or the second body 250 is tapered toward one end of the scissors 200.

As a result, there is a risk of safety incidents. In this context, a protrusion 230 may protrude forward, spaced upward from a distal end of the first body 220 and an insertion portion 232 may be formed between the protrusion 230 and the distal end of the body 220.

The protrusion 230 and the insertion portion 232 may be formed in same shapes as their counter parts of the afore-described knife and thus will not be described herein to avoid redundancy.

The protrusion 230 protrudes in one direction further than at least the distal end of the first body 220 in which an upper blade 231 is formed. Preferably, the protrusion 230 may protrude further than the distal ends of the first and second bodies 220 and 250 in the state where the first and second bodies 220 and 250 are brought into contact and overlapped, when seen from the front. The protrusion 230, the insertion portion 232, and the upper blade 231 are also applicable to the second body 250.

In the above-described knife 100 and scissors 200 according to the present invention, the protrusions 130 and 230 may function as protection means and guides. Accordingly, the protrusions 130 and 230 may be formed of a softer material than the bodies 120 and 220. Or a part of the protrusions 130 and 230 may be formed of the softer material.

The structure of the scissors 200 facilitates fine motions such as opening an envelope or removing a cover, with increased safety.

As is apparent from the foregoing description, the knife and scissors having a protection means according to the present invention obviate the need for reverse use by means of a protrusion, an insertion portion, and an upper blade formed at the bottom of the insertion portion. Therefore, a motion such as fine removal of the skin or film of an object can be made at one time, thereby remarkably increasing use accuracy and convenience.

Further, a pointed part is not directly exposed at the ends of the knife and the scissors. Accordingly, the looks of the knife and the scissors do not give a sense of unsafety and safety increases in using the knife and the scissors.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A knife with a protection means, having a handle, a body extended in one direction in engagement with the handle, and a body blade formed at a bottom of the body of the knife, for performing a cutting action, the knife comprising:
    a protrusion spaced upward from a distal end of an upper blade formed on a distal end of the body of the knife; and
    an insertion portion formed in a space between the body blade and the protrusion,
    wherein the upper blade cuts an object inserted in the insertion portion, and the protrusion protects a human body or the object by contacting the human body or the object earlier than the distal end of the body of the knife, when the body of the knife slips off the object, and
    wherein the protrusion is wider in forward and backward directions than the body of the knife and guides a forward proceeding of the upper blade, in close contact with a surface of the object to be cut, when a cutting action is performed by the upper blade.

2. The knife according to claim 1, wherein the insertion portion includes a lower blade formed at a bottom of the protrusion.

3. The knife according to claim 1, further comprising a step for protruding the distal end of the body of the knife having the upper blade formed therein further than the protrusion in a forward or backward direction.

4. The knife according to claim 1, wherein a side section of the protrusion is convex downward and when the body of the knife is tilted with respect to the object, the protrusion guides a cutting action of the upper blade by changing the position of a part of a bottom of the protrusion contacting a surface of the object.

5. Scissors with a protection means, having a first body, a second body, and a hinge connecting the first body to the second body, for cutting an object by rotating the first and second bodies upon the hinge and advancing the first and second bodies toward each other, the scissors comprising:
    a protrusion protruding in one direction, spaced upward from a distal end of an upper blade; and
    an insertion portion formed between a distal end of a body blade of the first body and the protrusion,
    wherein the upper blade cuts an object inserted in the insertion portion, and the protrusion protects a human body by contacting the human body earlier than a distal end of the first or second body, when the first body slips off the object, and
    wherein the protrusion is wider in forward and backward directions than the first body and guides a forward proceeding of the upper blade, in close contact with a surface of the object to be cut, when a cutting action is performed by the upper blade.

* * * * *